US006457680B1

(12) United States Patent
Dobrzynski et al.

(10) Patent No.: US 6,457,680 B1
(45) Date of Patent: Oct. 1, 2002

(54) AUXILIARY AIRFOIL FOR AIRCRAFT MAIN WINGS

(75) Inventors: Werner Dobrzynski; Burkhard Gehlhar, both of Wolfenbuettel (DE)

(73) Assignee: DRL Deutsches Zentrum fuer Luft-und Raumfahrt E.V., Cologne (DE)

( * ) Notice: Subject to any disclaimer, the term of this patent is extended or adjusted under 35 U.S.C. 154(b) by 0 days.

(21) Appl. No.: 09/587,279

(22) Filed: Jun. 5, 2000

(30) Foreign Application Priority Data

Jun. 4, 1999 (DE) .......................... 199 25 560

(51) Int. Cl.[7] ................................ B64C 9/16
(52) U.S. Cl. .................. 244/210; 244/211; 244/214; 244/216
(58) Field of Search ................. 244/210, 212, 244/213, 214, 215, 216, 35 R, 211

(56) References Cited

U.S. PATENT DOCUMENTS

| 3,203,647 A | | 8/1965 | Alvarez-Calderón ......... 244/42 |
| 3,486,720 A | | 12/1969 | Seglem et al. ............... 244/42 |
| 4,784,355 A | * | 11/1988 | Brine ......................... 244/216 |
| 5,551,651 A | * | 9/1996 | Hendrickson ................ 244/216 |
| 5,927,656 A | * | 7/1999 | Hinkleman .................. 244/214 |

FOREIGN PATENT DOCUMENTS

| DE | 1 481 580 | 5/1969 |
| DE | 1 907 710 | 8/1970 |
| DE | 31 14 143 | 10/1982 |
| EP | 0 188 823 | 7/1986 |
| EP | 0 227 643 | 7/1987 |

OTHER PUBLICATIONS

Van den Berg, B.; "An Experimental Investigation on an Airfoil With A Slat into the Effect of the Separation Bubble in the Slat Cove"; NLR Memorandum AL–85001U; Feb. 1985; 2 Sheets.

* cited by examiner

Primary Examiner—J. Woodrow Eldred
(74) Attorney, Agent, or Firm—Foley & Lardner

(57) ABSTRACT

A separating surface (6) is arranged on an additional airfoil for an aircraft main wing (3). The separating surface (6) is hinged on the main wing (3) and can be extended. The separating surface (6) extends in the direction of the main wing (3) and is arranged along a separation flow line (9) between a vortex flow region (8) and a slat cove flow (7) of the air flowing between the additional airfoil and the main wing (3).

24 Claims, 4 Drawing Sheets

AUXILIARY AIRFOIL FOR AIRCRAFT MAIN WINGS

BACKGROUND OF THE INVENTION

1. Field of the Invention

The invention relates to an auxiliary or additional airfoil for aircraft main wings, in which the additional airfoil is articulated to the main wing and can be extended.

2. Background of the Related Art

In order to increase lift during a landing approach at a reduced flying speed, additional airfoils, for example leading-edge slats and landing flaps, are fitted to aircraft main wings. These additional airfoils are extended during the landing approach, so that the effective profile curvature and lifting area of the main wing are increased. Commercial aircraft generally use leading-edge slats of the "Handley Page slat" type and so-called "Fowler flaps" as the landing flaps.

A trial with leading-edge slats in which the rear faces of the leading-edge slats have various shapes is described in van den Berg, B.: "An Experimental Investigation on an Airfoil with a Slat into the Effect of the Separation Bubble in the Slat Cove," NLR Memorandum AL-85-001 U, February 1985. In the "basic slat configuration," the cross-sectional shape of the leading-edge slat is designed such that the contour of the rear face of the leading-edge slat represents the negative image of the contour of the main wing leading edge. When the leading-edge slat is retracted during cruise flight, the leading-edge slat thus rests flush against the main wing.

With another cross-sectional shape, referred to as "slat hook rounded off," the lower area of the leading-edge slat rear face is rounded off and does not rest flush against the main wing when the leading-edge slat is retracted.

Another cross-sectional shape, the so-called "fairing in slat cove" has a raised area in the lower area of the leading-edge slat rear face, so that the cross-sectional shape of the leading-edge slat has a bubble contour. With this cross-sectional shape, the lift is increased when the leading-edge slat has been extended, since higher flow speeds occur in the slat cove flow between the leading-edge slat and the main wing.

DE-A 31 14 143 A1 discloses a wing having a leading-edge slat and a main wing, in which an auxiliary flap is provided on the underneath of the extendable leading-edge slat, in order to cover the slat cove between the leading-edge slat and the main wing. The lower face of the auxiliary flap is shaped such that the leading-edge slat rests flush against the main wing when it is retracted. This shape, which is matched to the main wing contour, cannot follow the shape of the separation flow line and thus cannot prevent flow detachment on the rear face of the leading-edge slat. The desired noise reduction thus cannot be achieved.

DE-A 1 907 710, DE-A 1 481 580, EP 0 227 643 A2, EP 0 188 823 A1 and U.S. Pat. No. 3,486,720 disclose corresponding wing structures in which a tab extending in the direction of the main wing is arranged on the lower face of the leading-edge slat. When retracted, this tab forms a flush termination for the leading-edge slat against the main wing. However, disadvantageously, this leads to increased noise emission.

U.S. Pat. No. 3,203,647 discloses a balloon on the leading edge of the additional airfoil of a wing structure. When the additional airfoil is extended, this balloon can be inflated, thus avoiding flow separation on the normally sharp leading edge of the additional airfoil.

SUMMARY OF THE INVENTION

Based on above knowledge and the known wing combinations, an object of the invention is to reduce the noise emission from commercial aircraft during landing approaches. During landing approaches, the noise from flow passing around the wing and the fuselage is generally greater than the noise from the engines, since engine noise reduction measures have already been successfully implemented for landing approaches. The most important aerodynamic noise sources are the landing gear, the leading-edge slats and the side edges of the landing flaps.

The above and other objects are achieved by an additional airfoil for an aircraft main wing, wherein a separating surface is arranged on the additional airfoil. The separating surface extends in the direction of the main wing, and is arranged along a separation flow line between a vortex flow region and a slat cove flow of the air flowing between the additional airfoil and the main wing.

When extended, flow detachment of the slat cove flow between the leading-edge slat and the main wing occurs in the form of a pronounced vortex on the rear face of the leading-edge slat. This vortex is continuously supplied with new energy from the adjacent slat cove flow. It has been found that balls of turbulence continuously enter the accelerated slat cove flow via the separation flow line between the vortex flow region and the slat cove flow, thus resulting in noise being produced. Furthermore, it has been found that noise is also produced by the balls of turbulence flowing away over the trailing edge of the leading-edge slat. In addition, it has been found that the geometric position of the vortex is not stable, so that the oscillating position of the vortex axis results in superimposition of an additional unsteady speed component, likewise resulting in aerodynamic noise being produced.

It has been found that these above-mentioned flow sources can be minimized by fitting a separating surface along the separation flow line between the vortex and the slat cove flow, without influencing the lift. This separating surface prevents impulse exchange transversely with respect to the direction of the slat cove flow.

It is sufficient for the vortex region to be only partially covered and for the separating surface not to enclose the entire rearward leading-edge slat profile. This allows the aerodynamic noise of the entire aircraft to be reduced by about 3 dB.

According to one embodiment, the separating surface may be rigid and in this case is preferably hinged on the additional airfoil such that it is capable of being pivoted in or retracted when the additional airfoil is retracted in the direction of the main wing. This ensures that, during cruise flight, the leading-edge slat can be positioned flush against the main wing, and no significant aerodynamic losses occur.

In accordance with another embodiment, the separating surface may also be flexible and can be retracted, e.g., by being pushed into the cove between the leading-edge slat and the main wing while the leading-edge slat is retracted. However, it has been found that the vortex can sometimes press a flexible separating surface against the rear face of the leading-edge slat when the latter is in the extended state, so that it does not automatically position itself on the separation flow line owing to this relationship of the forces.

It is thus more advantageous for the separating surface to be formed by an inflatable member or balloon which is fitted on the additional airfoil and to which pressure can be applied. When the additional airfoil is extended, the member can be inflated by applying pressure so that it completely replaces the vortex flow region. As the leading-edge slat is being retracted, the pressure is allowed out, and the member is pressed into the cove between the leading-edge slat and the main wing.

Additional objects, features and advantages of the invention will be set forth in the description of preferred embodiments which follows.

BRIEF DESCRIPTION OF THE DRAWINGS

The invention will be explained in more detail in the following text with reference to the attached drawings, in which.

The accompanying drawings, which are incorporated in and constitute a part of the specification, illustrate presently preferred exemplary embodiments of the invention, and, together with the general description given above and the detailed description of the preferred embodiments given below, serve to explain the principles of the invention.

DETAILED DESCRIPTION OF THE PREFERRED EMBODIMENTS

Figure 1:
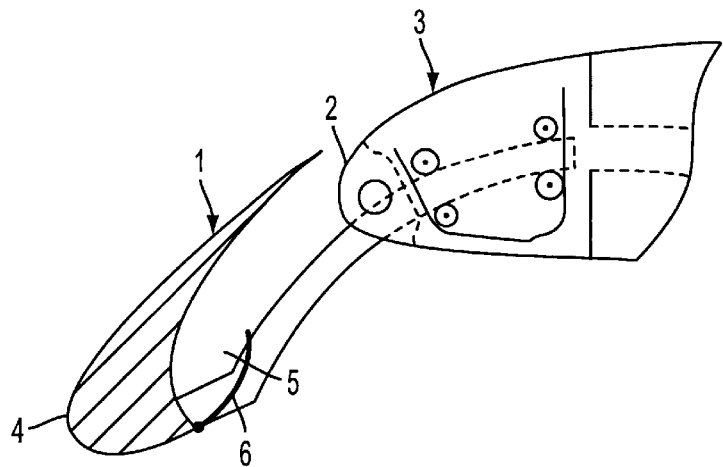
FIG. 1 shows a cross-sectional view of a leading-edge slat of the first embodiment with a separating surface in the extended state.

FIG. 1 is a cross section of a leading-edge slat 1 of the "Handley Page" type, which is hinged on the leading edge 2 of a main wing 3. The leading-edge slat 1 of additional wing 4 is in the extended state in FIG. 1. This setting is selected for the landing approach in order to increase lift. As can be seen, the contour of the rear face 5 of the leading-edge slat is matched to that of the leading edge 2 of the main wing 3. The separating surface 6 is hinged on the sectional lower edge of the rear face 5 of the leading-edge slat, and extends from there approximately in a parabolic shape in the direction of the leading edge 2 of the main wing 3. The separating surface 6 can preferably be folded in or retracted when the leading-edge slat 1 is moved toward the main wing 3, as is sketched in FIG. 2.

Figure 2:
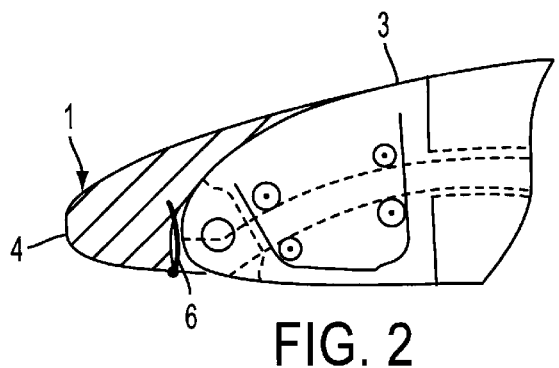
FIG. 2 shows a cross-sectional view of the leading-edge slat of the first embodiment with a separating surface in the retracted state.

As is sketched in FIG. 2, the separating surface 6 must be folded, for example into a stowage space in the rear face 5 of the leading-edge slat, to such an extent that the leading-edge slat 1 rests flush against the main wing 3, and there is thus no longer any gap in the contour of the overall arrangement of the leading-edge slat 1 and the main wing 3 (cruise configuration).

Figure 3:
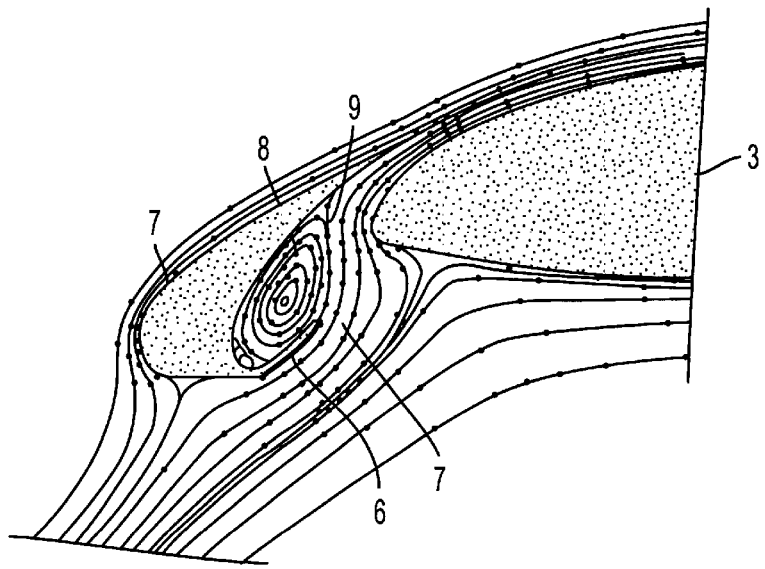
FIG. 3 shows a flow line illustration of the flow around a leading-edge slat.

FIG. 3 shows a typical flow line illustration for the flow around a leading-edge slat 1, which has been extended for a landing approach. As can be seen, a slat cove flow 7 flows between the leading-edge slat 1 and the main wing 3 so that this prevents flow detachment on the main wing 3 despite the sharp curvature of the overall arrangement. There is a vortex flow region 8 between the rear face 5 of the leading-edge slat and the slat cove flow 7. Turbulence balls enter the slat cove flow 7 across the separation flow line 9 between the vortex flow region 8 and the slat cove flow 7, which may also be referred to as a boundary layer, and are accelerated due to the narrowing of the slat cove in the upper region between the leading-edge slat 1 and the main wing 3. In addition, the vortex axis moves in an oscillatory fashion. This causes aerodynamic noise. If a separating surface 6 is now introduced into the separation flow line 9, this prevents any impulse from being exchanged transversely with respect to the direction of the slat cove flow 7, and reduces the oscillatory movement of the vortex axis.

Figure 4:
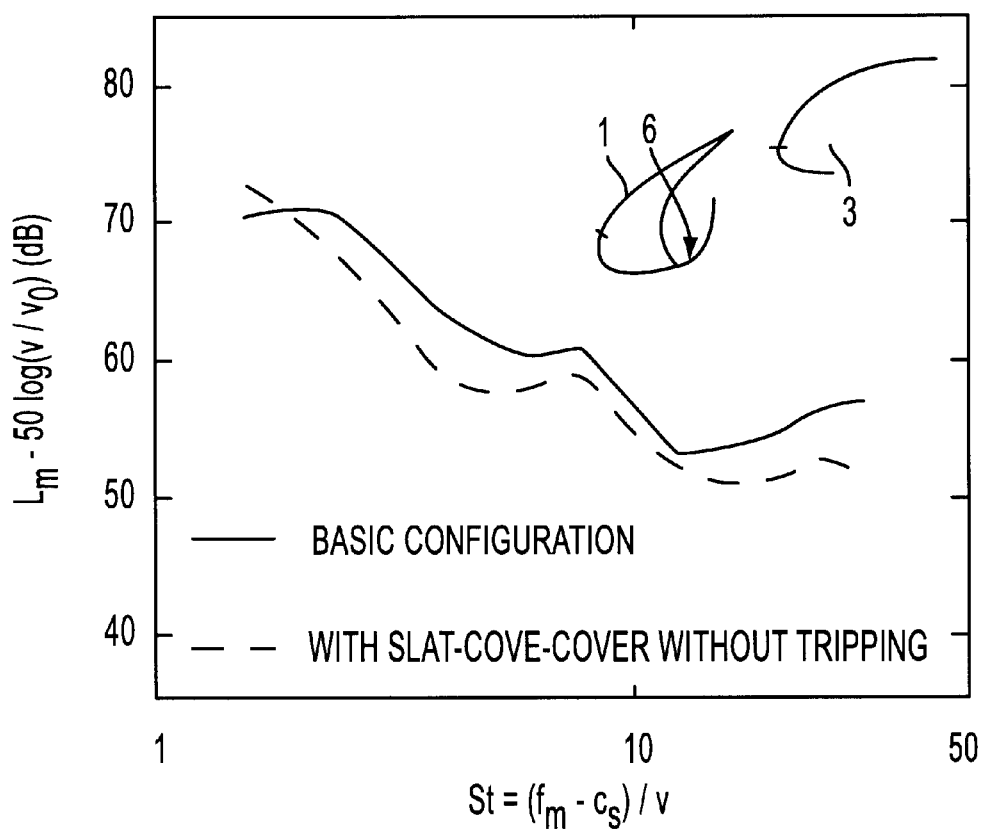
FIG. 4 shows a comparison of the relative source noise level for a leading-edge slat with and without a separating surface.

FIG. 4 shows a diagram in which a relative source noise level is plotted against a dimensionless frequency for a flow trial with a leading-edge slat 1 with and without a separating surface 6 in the separation flow line 9. The diagram shows that the leading-edge slat noise can be reduced by partially covering the rear face 5 of the leading-edge slat. The separating surface 6 has an approximately parabolic profile. It covers only about half the separation flow line 9 sketched in FIG. 3.

The relative source noise level for a leading-edge slat 1 without a separating surface 6 is plotted as a solid line against a dimensionless frequency in dB. As can be seen, the curve for the relative source noise level for the trial arrangements with separating surface 6, that is to say with a slat cove cover, are lower than the solid line. The source noise level could be reduced, as can be seen.

Figure 5:
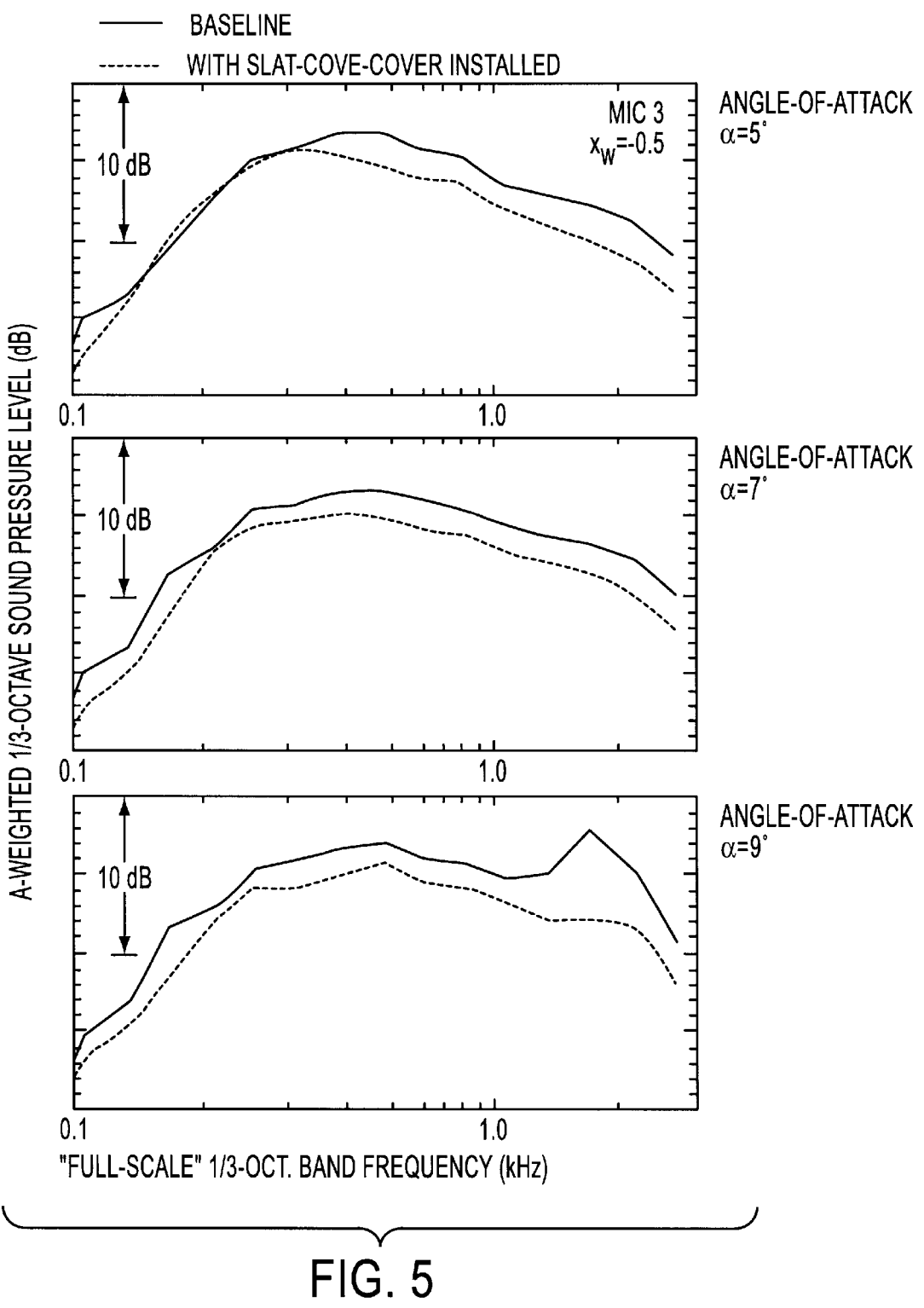
FIG. 5 shows the noise levels for a leading-edge slat with and without a separating surface as a function of the angle of attack of the leading-edge slat.

FIG. 5 shows the result of an experiment in which the measured noise level from a model is plotted against the frequency converted to the original configuration of the wings. The trial was carried out at various aircraft longitudinal axis angles of attack, namely at $\alpha=5°$, $7°$ and $9°$. The solid line in each case shows the noise level for a leading-edge slat 1 without a separating surface 6, and the dotted line shows the noise level for a leading-edge slat 1 with a separating surface 6 which, corresponding to FIG. 3, in places runs along the separation flow line 9. It can be seen from the diagram that the noise level can be reduced by the separating surface 6 at all incidence angles. The order of magnitude of the reduction in the noise level is approximately 3 dB.

Figure 6:
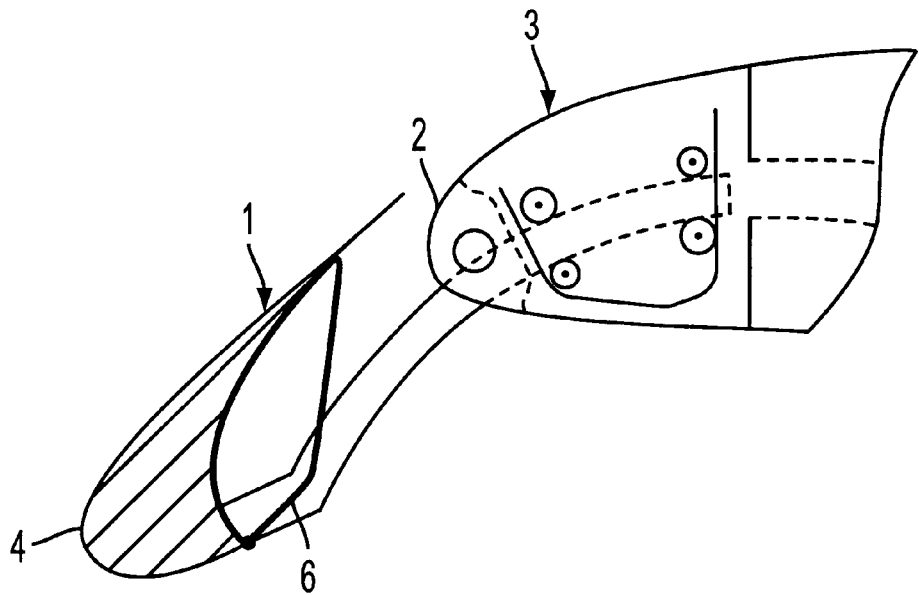
FIG. 6 shows a cross-sectional view of a leading-edge slat of the second embodiment with a separating surface in the extended state.
Figure 7:
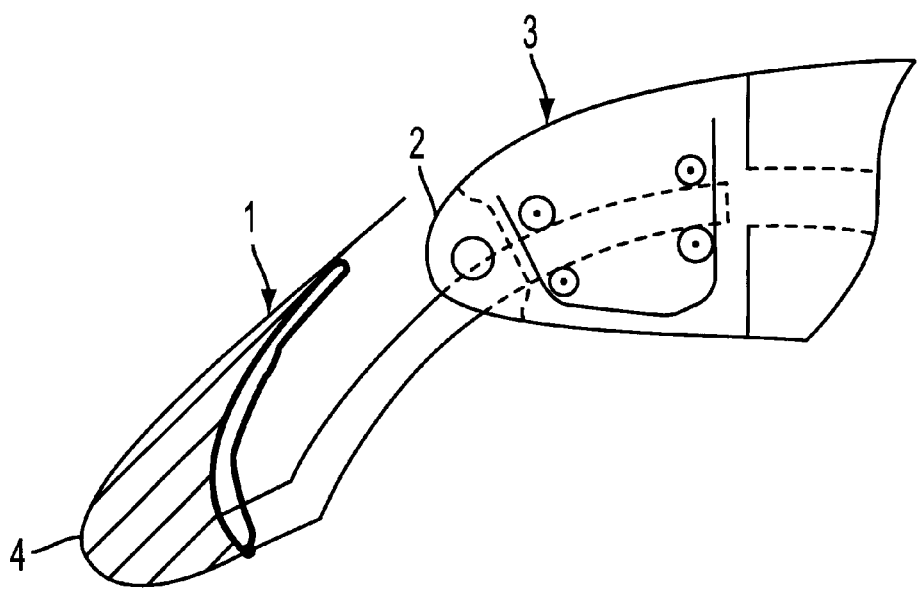
FIG. 7 shows a cross-sectional view of the leading-edge slat of the second embodiment with a separating surface in the retracted state.

The separating surface may also be flexible and be pushed into the cove between the leading-edge slat and the main wing while the leading-edge slat is retracted. For example, in the second embodiment illustrated in FIGS. 6 and 7, the separating surface is formed by an inflatable member, such as a balloon, which is fitted on the additional airfoil and to which pressure can be applied. When the additional airfoil is extended (FIG. 6), the balloon can be inflated by applying pressure so that it completely replaces the vortex flow region. As the leading-edge slat is being retracted (FIG. 7), the pressure is allowed out, and the balloon is pressed into the cove between the leading-edge slat and the main wing.

While particular embodiments according to the invention have been illustrated and described above, it will be clear that the invention can take a variety of forms and embodiments within the scope of the appended claims.

What is claimed is:

1. An additional airfoil for an aircraft main wing comprising a separating surface provided on the additional airfoil and extending in the direction of the main wing, wherein the separating surface extends along a separation flow line between a vortex flow region and a slat cove flow region of the air flowing between the additional airfoil and the main wing.

2. The additional airfoil as claimed in claim 1, wherein the additional airfoil is articulated to the main wing and the separating surface is articulated to the additional airfoil.

3. The additional airfoil as claimed in claim 2, wherein the separating surface is hinged on a rear face of the additional airfoil.

4. The additional airfoil as claimed in claim 1, wherein the separating surface only partially covers the separation flow line.

5. The additional airfoil as claimed in claim 1, wherein the separating surface completely covers the separation flow line.

6. The additional airfoil as claimed in claim 1, wherein the separating surface is rigid.

7. The additional airfoil as claimed in claim 6, wherein the separating surface is hinged on the additional airfoil and can pivot in when the additional airfoil is retracted in the direction of the main wing.

8. The additional airfoil as claimed in claim 6, wherein the separating surface is hinged on the additional airfoil and can pivot in as the angle of attack of the aircraft changes.

9. The additional airfoil as claimed in claim 1, wherein the separating surface is flexible.

10. The additional airfoil as claimed in claim 9, wherein the separating surface comprises an inflatable member.

11. The additional airfoil as claimed in claim 10, wherein the inflatable member is pressurized when the additional airfoil is extended.

12. The additional airfoil as claimed in claim 11, wherein the inflatable member is shaped such that, when inflated, it occupies the vortex flow region.

13. The additional airfoil as claimed in claim 11, wherein the inflatable member is shaped such that, when inflated, it completely occupies the vortex flow region.

14. A leading-edge slat for an aircraft wing structure comprising a separating surface provided on a rear face thereof, wherein the separating surface extends along a separation flow line between a vortex flow region and a slat cove flow region of the air flowing between the leading-edge slat and the aircraft wing structure.

15. The leading-edge slat as claimed in claim 14, wherein the separating surface is hinged on the rear face.

16. The leading-edge slat as claimed in claim 15, wherein the separating surface is rigid.

17. The leading-edge slat as claimed in claim 15, wherein the separating surface is flexible.

18. The leading-edge slat as claimed in claim 17, wherein the separating surface comprises an inflatable member.

19. The leading-edge slat as claimed in claim 18, wherein the inflatable member is pressurized when the additional airfoil is extended.

20. The leading-edge slat as claimed in claim 19, wherein the inflatable member is shaped such that, when inflated, it occupies the vortex flow region.

21. The additional airfoil as claimed in claim 3, wherein the separating surface includes a first end portion which is hinged to the rear face of the additional airfoil and a second end portion which is disposed farthest away from the first end portion, and wherein the second end portion is disposed farthest away from the rear face of the additional airfoil when the additional airfoil is extended, in order to lessen aerodynamic noise when the additional airfoil is extended.

22. The additional airfoil as claimed in claim 1, wherein the separating surface has a substantially curved shape that extends along the separation flow line when the additional airfoil is extended.

23. The leading-edge slat as claimed in claim 20, wherein the inflatable member is shaped to form a curved bottom surface when inflated, wherein the curved bottom surface is disposed substantially along the separation flow line, in order to lessen aerodynamic noise when the leading-edge slat is extended.

24. The leading-edge slat as claimed in claim 14, wherein the separating surface has a substantially curved shape that extends along the separation flow line when the additional airfoil is extended.

* * * * *

UNITED STATES PATENT AND TRADEMARK OFFICE
CERTIFICATE OF CORRECTION

PATENT NO. : 6,457,680 B1
DATED : October 1, 2002
INVENTOR(S) : Werner Dobrzynski et al.

It is certified that error appears in the above-identified patent and that said Letters Patent is hereby corrected as shown below:

<u>Title page,</u>
Item [73], please correct the name of the Assignee to read:
-- DLR Deutsches Zentrum fuer Luft-und Raumfahrt E.V., Cologne (DE) --

Signed and Sealed this

Eleventh Day of March, 2003

JAMES E. ROGAN
*Director of the United States Patent and Trademark Office*